(12) United States Patent
Fraij et al.

(10) Patent No.: US 8,113,107 B2
(45) Date of Patent: Feb. 14, 2012

(54) SYSTEM FOR PREPARING A BEVERAGE COMPRISING A BEVERAGE MAKER AND A CARTRIDGE THAT IS REMOVABLY ARRANGED IN THE BEVERAGE MAKER

(75) Inventors: Fred Fraij, Drachten (NL); Edwin Wilco Drost, Hoogeveen (NL); Paulus Cornelis Duineveld, Drachten (NL); Marinus Christian Hansen, Odoornerveen (NL); Hermanus Josephus Kodden, Hoogeveen (NL); Joeke Noordhuis, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 989 days.

(21) Appl. No.: 12/088,847

(22) PCT Filed: Sep. 22, 2006

(86) PCT No.: PCT/IB2006/053429
§ 371 (c)(1),
(2), (4) Date: Mar. 31, 2008

(87) PCT Pub. No.: WO2007/036856
PCT Pub. Date: Apr. 5, 2007

(65) Prior Publication Data
US 2008/0250937 A1  Oct. 16, 2008

(30) Foreign Application Priority Data
Sep. 30, 2005  (EP) ..................................... 05109088

(51) Int. Cl.
*A47J 31/44* (2006.01)

(52) U.S. Cl. .......... 99/323.3; 99/323.1; 99/300; 99/293; 99/279

(58) Field of Classification Search .................... 99/275, 99/323.1, 323.3, 300, 293, 279
See application file for complete search history.

(56) References Cited

U.S. PATENT DOCUMENTS

| 5,884,552 A * | 3/1999 | Lussi et al. ................... 99/323.1 |
| 6,698,333 B2 * | 3/2004 | Halliday et al. ................ 99/295 |
| 7,654,191 B2 * | 2/2010 | Greenwald et al. ............. 99/275 |

(Continued)

FOREIGN PATENT DOCUMENTS

EP                803219            10/1997

(Continued)

*Primary Examiner* — Raleigh W. Chiu
(74) *Attorney, Agent, or Firm* — Sherry Austin

(57) ABSTRACT

A system for preparing a beverage comprises a beverage maker (15) and a cartridge (10) that is removably arranged in the beverage maker (15). The cartridge (10) comprises a beverage making unit (1) having a duct system (30) for conveying flows of steam and flows of liquid. The duct system (30) comprises two combinations of ducts (31, 32; 41, 42), wherein the arrangement of the ducts (31, 32; 41, 42) of each combination is adapted to enabling a flow of steam to perform a pumping action on a flow of liquid. The beverage maker (15) comprises a steam generator (16) having two steam sockets (17, 18), wherein each of the steam sockets (17, 18) is in communication with another combination of ducts (31, 32; 41, 42) of the duct system (30). As each of the combinations of ducts (31, 32; 41, 42) is associated with a different steam inlet (36, 46), and the steam inlets (36, 46) may be located at different positions on the cartridge (10), it is achieved that the duct system (30) may be of a relatively simple design.

11 Claims, 3 Drawing Sheets

U.S. PATENT DOCUMENTS

Figure 1:
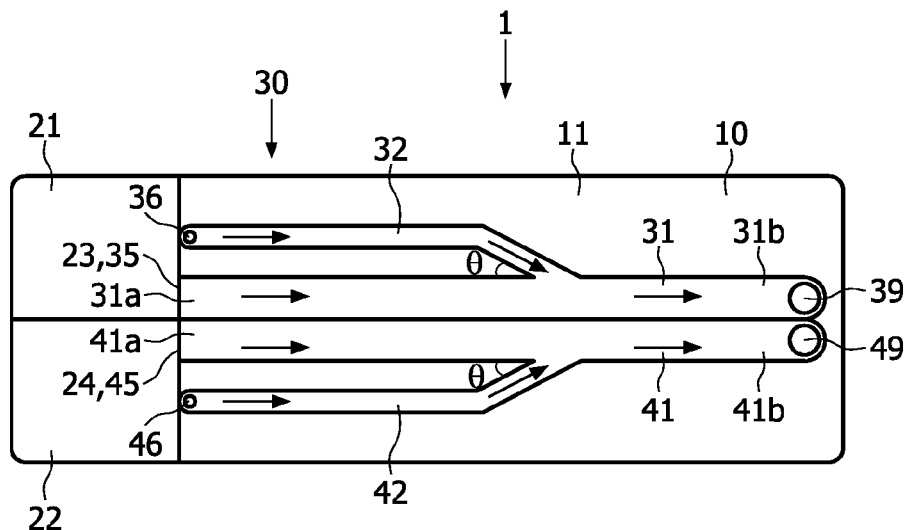

| | | |
|---|---|---|
| 2003/0005826 A1 | 1/2003 | Srgent |
| 2003/0232115 A1* | 12/2003 | Eckenhausen et al. ....... 426/477 |
| 2008/0302251 A1* | 12/2008 | Rijskamp et al. ................ 99/295 |
| 2009/0104336 A1* | 4/2009 | Fraij et al. ..................... 426/590 |

FOREIGN PATENT DOCUMENTS

| | | |
|---|---|---|
| EP | 1374748 | 1/2004 |
| WO | WO01/58786 | 8/2001 |
| WO | 2005063093 | 7/2005 |

\* cited by examiner

SYSTEM FOR PREPARING A BEVERAGE COMPRISING A BEVERAGE MAKER AND A CARTRIDGE THAT IS REMOVABLY ARRANGED IN THE BEVERAGE MAKER

The present invention relates to a system for preparing a beverage, comprising a beverage maker and a cartridge that is removably arranged in the beverage maker; wherein the cartridge comprises a beverage making unit having a duct system for conveying flows of fluids.

In WO 01/58786, a cartridge for use in a beverage maker is disclosed. The known cartridge contains one or more beverage ingredients, and comprises an inlet for the introduction of water into the cartridge, a compartment containing the beverage ingredients, and an outlet for the beverage produced from the beverage ingredients. The cartridge also comprises a restriction for producing a jet of the beverage, at least one inlet for air, and an expansion chamber for generating a pressure reduction of the jet of beverage, whereby in use air from the at least one air inlet is incorporated into the beverage as a plurality of small bubbles. Thus, when the cartridge is applied, it is possible to obtain a frothed beverage.

In use, the cartridge has water under pressure passed therethrough. The water is forced to flow through the beverage ingredients contained within the compartment, so that the water mixes with these ingredients. The beverage that is obtained in this way is forced under pressure through the restriction, as a result of which a jet of the beverage is produced. Subsequently, the jet of beverage is delivered to a chamber which acts as an expansion chamber, wherein the pressure of the jet of beverage is reduced, and air is incorporated into the beverage via the at least one air inlet.

The cartridge is suitable for insertion into a beverage maker, which comprises means for opening the water inlet and the beverage outlet of the cartridge, which are both initially closed. Furthermore, the beverage maker which is suitable for operating the cartridge comprises means for supplying water under pressure to the cartridge.

As the cartridge known from WO 01/58786 contains a certain amount of beverage ingredients, it is a disposable cartridge, which is suitable to be used one time or a limited number of times. In general, an important advantage of the application of disposable cartridges is that it is possible to keep the interior of a beverage maker from getting contaminated, wherein there is no need for the user to clean the interior of the beverage maker every time the beverage maker has been used. Another advantage of the application of disposable cartridges is related to the fact that disposable cartridges are easy to use. In particular, when disposable cartridges are applied, preparations of a process of making a beverage only involve placing a cartridge in a beverage maker. Furthermore, a user does not need to dose one or more ingredients of the beverage, as the disposable cartridges may contain the right amount of these ingredients. Yet another advantage of the application of disposable cartridges is that a higher reliability of the operation of the beverage maker is achieved, as malfunctioning of the beverage maker due to contamination of the beverage making unit does not occur.

It is an objective of the present invention to provide a system for preparing a beverage, comprising a beverage maker and a cartridge, such that the advantages of applying a disposable cartridge are also applicable to the system of the present invention, wherein the functionality of the beverage maker is increased with respect to systems known thus far, so that the beverage maker is capable of receiving and operating cartridges having various designs and functionalities, wherein the cartridges may be relatively simple, as small as possible, and cheap. This objective of the present invention is achieved by a system for preparing a beverage, comprising a beverage maker and a cartridge that is removably arranged in the beverage maker; wherein the cartridge comprises a beverage making unit having a duct system for conveying flows of fluids; wherein the arrangement of ducts of the duct system is adapted to enabling at least one flow of fluid to perform a pumping action on another flow of fluid; wherein the beverage maker comprises at least two supplying members for supplying to the duct system fluid to be applied in a pumping flow of fluid; and wherein at least one of the supplying members of the beverage maker is in communication with the duct system of the beverage making unit of the cartridge.

According to the present invention, the beverage maker comprises at least two supplying members for supplying to the duct system of the beverage making unit of the cartridge fluid to be applied in a pumping flow of fluid, and the cartridge comprises at least one inlet for letting in such fluid. In this way, it is achieved that the beverage maker is adapted to receiving cartridges of various designs. For example, it is possible for the beverage maker to receive and operate a cartridge for preparing a single beverage, for example a cartridge for preparing coffee, wherein only one pumping flow of fluid, for example a flow of steam, is needed for pumping and heating liquid coffee. In such a case, it is sufficient for the duct system that is present inside the cartridge to be in communication with only one of the supplying members of the beverage maker. However, it is just as well possible for the beverage maker to receive and operate a cartridge for preparing two beverages, for example a cartridge for preparing coffee and frothed milk, wherein one pumping flow of fluid, for example a flow of steam, is needed for pumping and heating liquid coffee, and wherein another pumping flow of fluid, for example a flow of steam, is needed for pumping and heating milk. Even in the latter case, the design of the cartridge, in particular the design of the duct system of the beverage making unit of the cartridge, may be relatively simple, due to the fact that the cartridge may be connected to a supply of pumping fluid (steam) at two connection points, wherein it is easy to lead the pumping fluid directly to an appropriate place in the duct system of the cartridge.

In case the cartridge has at least two inlets for letting in fluid to be applied in a pumping flow of fluid, it is advantageous to realize a situation in which each of the supplying members of the beverage maker is in communication with the duct system of the beverage making unit of the cartridge, wherein outlets of the supplying members are connected to different inlets of the duct system. In that way, it is achieved that the ducts of the duct system may be as short as possible, wherein different ducts for conveying pumping flows of fluid are associated with different inlets of the cartridge. This results in a relatively simple design of the duct system, and to an increase of the effectiveness of the pumping flow of fluid.

In the system according to the present invention, it is possible for the supplying members of the beverage maker to be adapted to supplying different fluids to be applied in a pumping flow of fluid. For example, one of the supplying members may be adapted to supplying steam, and another of the supplying members may be adapted to supplying hot water. A beverage maker in which the supplying members are adapted to supplying different fluids is capable of operating many types of cartridges, for the purpose of preparing many types of beverages. Preferably, such a beverage maker comprises detecting means for detecting properties of the cartridge, and controlling means for determining the way in which the cartridge needs to be operated and for controlling the beverage maker in such a manner that the correct operation of the cartridge is realized. In this respect, it is noted that the detection of the properties of the cartridge may be realized in any suitable way. For example, the cartridge may be marked by a certain code, wherein the beverage maker is equipped with a reader for reading the code, and wherein the controlling means are capable of interpreting input provided by the reader.

Within the scope of the present invention, it is also possible that at least two supplying members of the beverage maker are connected to one and the same apparatus for supplying one type of fluid to be applied in a pumping flow of fluid. For example, the beverage maker may comprise a steam generator, wherein at least two supplying members for supplying steam are connected to this steam generator.

The present invention also relates to a cartridge for use in a system as described in the foregoing, comprising a beverage making unit having a duct system for conveying fluids; wherein the arrangement of ducts of the duct system is adapted to enabling at least one flow of fluid to perform a pumping action on another flow of fluid; and wherein the duct system has at least two inlets for letting in fluid to be applied in a pumping flow of fluid.

The cartridge according to the present invention may be a disposable cartridge which is meant to be thrown away by a user after one use or a limited number of uses. Such cartridges are adapted to being inserted in a space in a beverage maker and to getting connected to fixedly arranged elements of the beverage maker upon receipt in the space. In particular, inlets of the duct system of the beverage making unit of such cartridges are connectable to members in the beverage maker for supplying the required fluids.

The cartridge according to the present invention, which has at least two inlets for letting in fluid to be applied in a pumping flow of fluid offers many advantages with respect to a cartridge having only one inlet for letting in such fluid. For example, it is possible to have at least two combinations of ducts acting as a pump during operation of the cartridge, wherein each combination is associated with its own inlet of fluid to be applied in a pumping flow of fluid. In this way, it is achieved that the pumping action of a pumping flow of fluid on a pumped flow of fluid is very effective. Also, the application of various inlets for letting in fluid to be applied in a pumping flow of fluid offers the possibility of having a relatively simple design of the duct system of the beverage making unit of the cartridge, wherein the ducts may be as short as possible, as the ducts for conveying a pumping flow of fluid may extend between a position where these ducts need to merge into another duct and the nearest inlet.

Furthermore, a cartridge having more than one inlet for letting in fluid to be applied in a pumping flow of fluid is capable of receiving and using different types of such fluid. For example, the cartridge may be connectable to supplies of hot water under pressure and steam.

In a practical embodiment, the duct system of the beverage making unit of the cartridge comprises at least one main duct and at least two subsidiary ducts merging into such a main duct, wherein the subsidiary ducts are adapted to conveying a pumping flow of fluid, and wherein the main duct is adapted to conveying a pumped flow of fluid. For example, the duct system comprises one main duct and two subsidiary ducts merging into this main duct, wherein the main duct is connected to a reservoir filled with a liquid such as milk, and wherein the subsidiary ducts are connected to a supply of steam, via at least two inlets of the cartridge. In an alternative embodiment, the duct system comprises two main ducts and two subsidiary ducts, wherein each of the subsidiary ducts merge into another of the main ducts.

For sake of completeness, it is noted that the ducts of the duct system of the beverage making unit of the cartridge may be tubes, but may also be recesses in a surface of a suitable cartridge element, for example, which are covered by a foil sheet or other suitable covering means.

In case the duct system of the beverage making unit of the cartridge comprises at least two subsidiary ducts merging into one and the same main duct, it is advantageous if the subsidiary ducts merge into the main duct at different sides of the main duct and/or at different positions along a longitudinal axis of the main duct. In this way, it is achieved that the extent to which the fluid from the pumping flow of fluid and the fluid from the pumped flow of fluid get mixed is enhanced. Furthermore, in case the pumping flow of fluid has a function in heating the pumped flow of fluid, local boiling of the fluid in the pumped flow is prevented, as the total quantity of the fluid which is needed for the purpose of putting the fluid in the pumped flow to a predetermined temperature is supplied in at least two separate portions, so that more homogeneous heating of the fluid in the pumped flow is realized.

In a preferred embodiment of the cartridge, in particular an embodiment having two subsidiary ducts, each subsidiary duct is associated with another inlet for letting in fluid to be applied in a pumping flow of fluid. In case more than two subsidiary ducts are present, it is possible that the duct system of the beverage making unit of the cartridge comprises at least one distribution duct associated with an inlet for letting in fluid to be applied in a pumping flow of fluid, wherein the distribution duct is connected to at least two subsidiary ducts. In that case, the number of supplying members of the beverage maker which is applied for operating the cartridge may be smaller than the number of subsidiary ducts of the duct system. For example, the duct system may comprise two distribution ducts, wherein each of these ducts is associated with an inlet for letting in fluid to be applied in a pumping flow of fluid, and wherein each of these ducts is connected to at least two subsidiary ducts for conveying a pumping flow of fluid.

According to an important aspect of the present invention, it is possible to realize a cartridge which comprises at least two combinations of a main duct and at least one subsidiary duct, wherein each combination is associated with another inlet for letting in fluid to be applied in a pumping flow of fluid. In other words, it is possible to realize a cartridge having at least two combinations of ducts acting as a pump during operation of the cartridge, wherein each combination is associated with its own inlet of fluid to be applied in a pumping flow of fluid. In such a cartridge, the various pumps are arranged in parallel, as it were. It is therefore possible to use different pumps for the preparation of different beverages. Outgoing flows of these beverages may be received and mixed in a common outlet duct, but it is also possible that such flows are kept separate.

In principle, the pumping action which is performed by one fluid on another fluid during operation of the cartridge may be obtained in any suitable manner. For example, the pumping action may be obtained on the basis of a principle known as venturi principle, according to which a fluid is sucked in a chamber under the influence of a local underpressure that is obtained by successively conducting a pumping flow of fluid through a restriction and supplying this pumping flow of fluid to the chamber. However, the pumping action may also be obtained on the basis of another principle, in particular a principle known as ejector principle, according to which a flow of a fluid is generated under the influence of a local underpressure that is obtained by allowing for a transfer of momentum from a pumping flow of fluid to the pumped flow of fluid.

In a practical embodiment of a duct system of a beverage making unit of a cartridge which is adapted to letting pumping actions take place by applying the venturi principle, an end portion of the duct for conveying the pumping flow of fluid, through which this duct is connected to the duct for conveying the pumped flow of fluid, is restricted, and wherein a portion of the duct for conveying the pumped flow of fluid, into which the duct for conveying the pumping flow of fluid merges, is widened. In a practical embodiment of a duct system of a beverage making unit of a cartridge which is adapted to letting pumping actions take place by applying the ejector principle, a longitudinal axis of a duct for conveying the pumping flow of fluid extends at an angle smaller than 90° with respect to a longitudinal axis of a duct for conveying the pumped flow of fluid at the position where the first duct merges into the latter duct.

In a feasible embodiment, the cartridge comprises at least one reservoir containing a liquid. Within the scope of the present invention, this reservoir may be refillable. In such a case, the cartridge may be used several times. However, in case the cartridge is only intended for single use or a limited number of uses, there is no need for the reservoir to be refillable.

Advantageously, the duct system of the beverage making unit of the cartridge comprises at least one air inlet for letting in air to the duct system, so that frothed beverages may be prepared.

The present invention also relates to a beverage maker for receiving and operating a cartridge as described in the foregoing, comprising a space for receiving the cartridge; and at least two supplying members for supplying to the duct system of the beverage making unit of the cartridge fluid to be applied in a pumping flow of fluid. The supplying members may be connected to one and the same apparatus which is arranged in the beverage maker for supplying one type of fluid to be applied in a pumping flow of fluid, but the supplying members may also be adapted to supplying different fluids.

Figure 2:
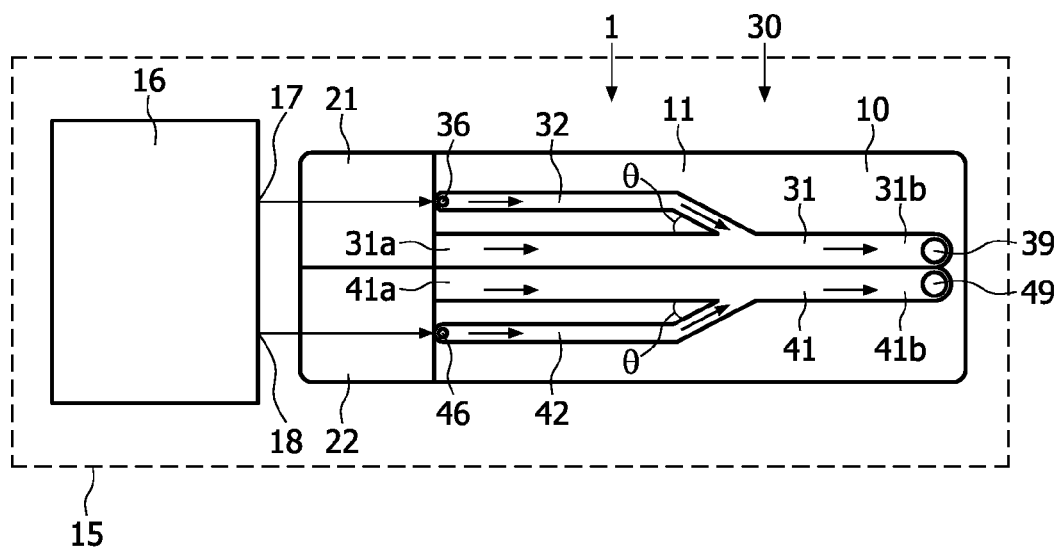
Figure 3:
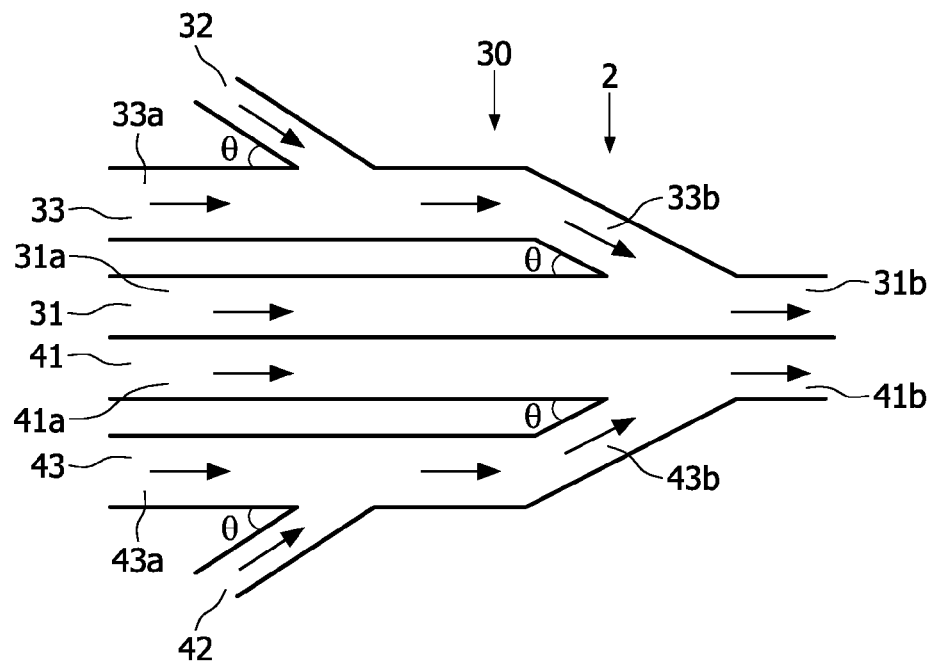
Figure 4:
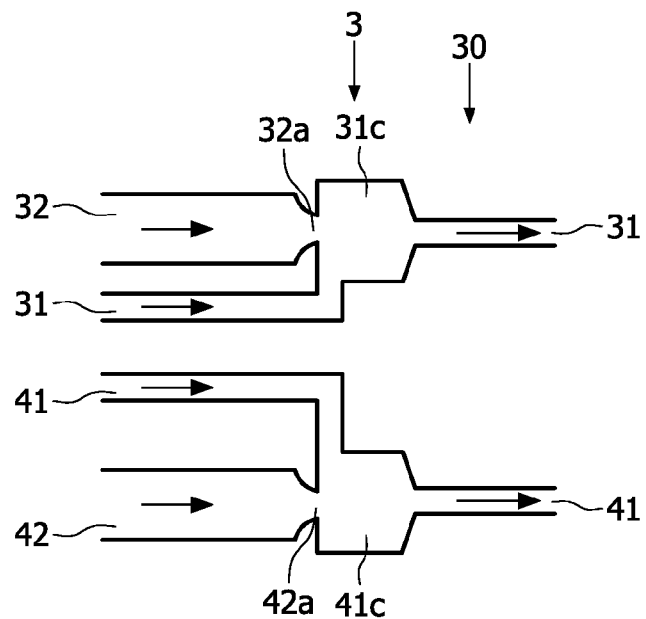
Figure 5:
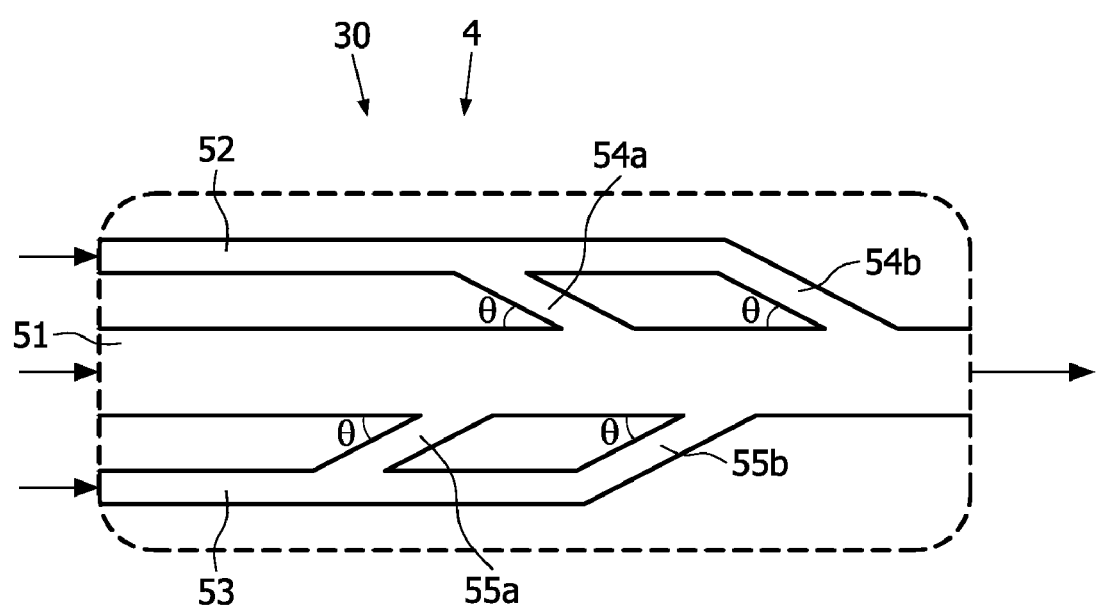

The present invention will now be explained in greater detail with reference to the figures, in which similar parts are indicated by the same reference signs, and in which:

FIG. 1 diagrammatically shows a disposable cartridge for use in a beverage maker, comprising a beverage making unit according to a first preferred embodiment of the present invention;

FIG. 2 diagrammatically shows components of a beverage maker and the disposable cartridge shown in FIG. 1, wherein the disposable cartridge is placed in the beverage maker, and wherein the disposable cartridge is connected to members of the beverage maker;

FIG. 3 diagrammatically shows a duct system of a beverage making unit according to a second preferred embodiment of the present invention;

FIG. 4 diagrammatically shows a duct system of a beverage making unit according to a third preferred embodiment of the present invention; and FIG. 5 diagrammatically shows a duct system of a beverage making unit according to a fourth preferred embodiment of the present invention.

FIG. 1 diagrammatically shows a disposable cartridge 10 for use in a beverage maker, comprising a beverage making unit 1 according to a first preferred embodiment of the present invention. The disposable cartridge 10 as shown is intended for single use, in other words, it is only possible to use the cartridge 10 one time in a process of preparing a beverage. After the cartridge 10 has been applied one time, it is no longer useful, and it is only fit to be thrown away.

FIG. 2 diagrammatically shows the disposable cartridge 10 and components of a beverage maker 15, wherein the disposable cartridge 10 is placed in the beverage maker 15, and wherein the disposable cartridge 10 is connected to components of the beverage maker 15. In FIG. 2, the beverage maker 15 in general is represented by a rectangle of dashed lines. For sake of completeness, it is noted that the disposable cartridge 10 is removably arranged in the beverage maker 15, so that the cartridge 10 may be removed from the beverage maker 15 after the cartridge 10 has been operated for the purpose of making a beverage. Hence, connections between the cartridge 10 and components of the beverage maker 15 are of a temporary nature.

Besides the beverage making unit 1, the disposable cartridge 10 comprises a first reservoir 21 containing a liquid, for example milk, and a second reservoir 22 containing a liquid as well, for example liquid coffee. In the shown example, both reservoirs 21, 22 are shaped as a more or less square sealed pouch, which may be manufactured by providing two foil sheets and interconnecting these foil sheets along their peripheries. That does not alter the fact that the reservoirs 21, 22 may be realized in another suitable way, for example as a recess in a surface of an element of the disposable cartridge 10, wherein the recess is covered by a foil sheet.

The beverage making unit 1 of the disposable cartridge 10 comprises a duct system 30. In the first preferred embodiment as shown, the duct system 30 comprises a first combination of a main duct 31 and a subsidiary duct 32 merging into the main duct 31, wherein an inlet 35 of the main duct 31 is connected to an outlet 23 of the first reservoir 21. Furthermore, the duct system 30 comprises a second combination of a main duct 41 and a subsidiary duct 42 merging into the main duct 41, wherein an inlet 45 of the main duct 41 is connected to an outlet 24 of the second reservoir 22. The inlet 35 of the main duct 31 of the first combination of ducts 31, 32 functions as a first liquid inlet 35 of the duct system 30, and the inlet 45 of the main duct 41 of the second combination of ducts 41, 42 functions as a second liquid inlet 45 of the duct system 30.

In both combinations of ducts 31, 32; 41, 42, an angle $\theta$ between longitudinal axes of the main duct 31, 41 and the subsidiary duct 32, 42 is smaller than 90°, in an order of about 25°. In the shown example, the main ducts 31, 41 are arranged next to each other, and extend parallel with respect to each other.

The disposable cartridge 10 having the beverage making unit 1 according to the first preferred embodiment of the present invention may be operated in various manners. According to one possible manner, in the first combination of ducts 31, 32, milk is supplied by an inlet portion 31a of the main duct 31, and steam is supplied by the subsidiary duct 32. In the process, momentum is transferred from the steam to the milk, as a result of which a local underpressure is obtained and a flow of milk is generated. Furthermore, the steam condenses in the milk, as a result of which the milk is heated. Therefore, the beverage which is obtained in the first combination of ducts 31, 32 is hot milk, which is conveyed further through an outlet portion 31b of the main duct 31.

Likewise, in the second combination of ducts 41, 42, liquid coffee is supplied by an inlet portion 41a of the main duct 41, and steam is supplied by the subsidiary duct 42. In the process, momentum is transferred from the steam to the coffee, as a result of which a local underpressure is obtained and a flow of coffee is generated. Furthermore, the steam condenses in the coffee, as a result of which the coffee is heated. Therefore, the beverage which is obtained in the second combination of ducts 41, 42 is hot coffee, which is conveyed further through an outlet portion 41b of the main duct 41.

The beverage making processes which take place in the first combination of ducts 31, 32 and the second combination of ducts 41, 42 may be performed simultaneously. That does not alter the fact that it is also possible that these processes are performed one after another. For example, the hot milk can be made right after the hot coffee has been made, wherein the hot coffee and the hot milk may be delivered to the same cup. Furthermore, it is possible that only one of the combinations of ducts 31, 32; 41, 42 is operated, so that only hot coffee or only hot milk is obtained. It is clear that the application of two combinations of ducts 31, 32; 41, 42 in the duct system 30 of the beverage making unit 1 of the disposable cartridge 10 is advantageous in view of the fact that a user may choose from different ways of operating the cartridge 10.

Within the scope of the present invention, it is possible that the outlet portions 31b, 41b of the main ducts 31, 41 are separated, and that each of these outlet portions 31b, 41b ends at its own outlet 39, 49, in a manner such as illustrated by FIGS. 1 and 2. However, it is also possible that the outlet portions 31b, 41b of the main ducts 31, 41 are joined at a certain point, and that the duct system 30 comprises only one outlet for letting out a beverage. In such a case, the cartridge 10 can not be applied for the purpose of realizing a simultaneous supply of two separate beverages. Still, it may be advantageous to use such a cartridge 10, for example in case it is desired to obtain a mixture of beverages.

It is possible to have one or more inlets for letting in air arranged in at least one of the ducts 31, 32; 41, 42 of the duct system 30, so that the beverage that is eventually obtained by applying the beverage making unit 1 according to the first preferred embodiment of the present invention may be frothed. Such inlet may be closeable, for example by means of a valve, so that a user may choose to have a frothed beverage, or not. Preferably, the valve or other suitable closing means are part of the beverage maker 15 for operating the disposable cartridge 10, so that the cartridge 10 may comprises as less as possible components and be as cheap as possible. Furthermore, in case the duct system 30 has an air inlet, obstructions may be arranged inside the duct system 30 for improving froth quality and volume on the basis of an increase of flow resistance and/or an increase of agitation.

The beverage making unit 1 according to the first preferred embodiment of the present invention may also be used for preparing a cold beverage, for example. In such a case, ingredients such as syrup and water may be applied.

According to a practical possibility, the ducts 31, 32; 41, 42 are formed as recesses in a body 11 of the disposable cartridge 10. The recesses are covered by suitable means (not shown) for closing a top side of the recesses. An example of suitable closing means is a foil sheet. It is noted that the ducts 31, 32; 41, 42 do not necessarily need to comprise recesses and closing means, as long as the ducts 31, 32; 41, 42 are capable of conveying fluids. For example, the ducts 31, 32; 41, 42 might as well comprise tubes. However, it is advantageous to have recesses and foil sheets for covering the recesses, as a manufacturing process of such an arrangement may be easier than a process of assembling a number of tubes, given the fact that the body 11 may be formed by using injection moulding techniques.

Within the scope of the present invention, the shape of a cross-section of the ducts 31, 32; 41, 42 of the duct system 30 may be any suitable shape. For example, the cross-section may be circular, rectangular, square or hexagonal. An advantage of a circular cross-section is that a relatively low flow resistance of the duct 31, 32; 41, 42 is obtained.

According to the shown possibility of applying the disposable cartridge 10, the beverage making unit 1 is used for the purpose of making hot coffee and/or hot milk, wherein steam is supplied to heat and pump the liquids. In order to have a supply of steam, the beverage maker 15 for receiving and operating the disposable cartridge 10 comprises a steam generator 16. In FIG. 2, it is shown that when the disposable cartridge 10 is placed in the beverage maker 15, each of the subsidiary ducts 32, 42 of a combination of ducts 31, 32; 41, 42 is connected to a steam socket 17, 18 of the steam generator 16. An end of the subsidiary duct 32 of the first combination of ducts 31, 32, which is connected to a first steam socket 17 of the steam generator 16 when the disposable cartridge 10 is placed in the beverage maker 15, functions as a first steam inlet 36 of the duct system 30, and an end of the subsidiary duct 42 of the second combination of ducts 41, 42, which is connected to a second steam socket 18 of the steam generator 16 when the disposable cartridge 10 is placed in the beverage maker 15, functions as a second steam inlet 46 of the duct system 30.

For sake of completeness, it is noted that it is also possible to have two steam sockets 17, 18 available in case the beverage maker 15 comprises two steam generators 16. Hence, a beverage maker 15 having more than one steam generator 16 is also within the scope of the present invention.

In the following, a process of preparing a beverage, in which the disposable cartridge 10 and the beverage maker 15 are applied, will be described. For sake of clarity, directions of incoming flows and an outgoing flow are indicated by means of arrows in FIGS. 1 and 2.

Preparations of the process of preparing a beverage comprise the step of placing the disposable cartridge 10 in the beverage maker 15, and placing a receptacle such as a cup or the like underneath the outlets 39, 49 of the duct system 30 of the beverage making unit 1 of the cartridge 10. In the process of putting the disposable cartridge 10 in the right place in the beverage maker 15, connections are established between the steam sockets 17, 18 of the steam generator 16 of the beverage maker 15 and the steam inlets 36, 46 of the duct system 30 of the beverage making unit 1 of the cartridge 10.

When the process of preparing the beverage is started, it is important that at least one liquid is allowed to flow from a reservoir 21, 22 to an associated main duct 31, 41, through an associated liquid inlet 35, 45 of the duct system 30. Depending on input provided by a user, only the liquid in the first reservoir 21 will be used, only the liquid in the second reservoir 22 will be used, or both liquids will be used, simultaneously, or one after another. In the following, a process for preparing a beverage in which both liquids are used simultaneously will be described. In order to allow the liquids to flow from the reservoirs 21, 22, suitable means (not shown) are applied for piercing the foil of the reservoirs 21, 22 at an appropriate position. For example, such means may comprise a movably arranged pin.

The actual process of preparing the beverage starts when the liquids are present in the main ducts 31, 41 of both combinations of ducts 31, 32; 41, 42 and the steam generator 16 is in operation, wherein steam enters the subsidiary ducts 32, 42 of both combinations of ducts 31, 32; 41, 42 through the steam inlets 36, 46. In each combination of ducts 31, 32; 41, 42, at the other end of the subsidiary duct 32, 42, i.e. the end where this subsidiary duct 32, 42 merges into the main duct 31, 41, momentum is transferred from the flow of steam to the liquid in the main duct 31, 41, as a result of which a local underpressure is obtained. Under the influence of this local underpressure, the liquid is drawn out of the reservoir 21, 22, wherein a flow of liquid, which is directed toward the outlet 39, 49 of the beverage making unit 1 is generated. Hence, the steam that is supplied through the subsidiary ducts 32, 42 of both combinations of ducts 31, 32; 41, 42 performs a pumping action on the liquids in the main ducts 31, 41 of both combinations of ducts 31, 32; 41, 42, on the basis of a principle which is referred to as the ejector principle. In the process, the steam condenses in the liquids, so that the liquids are heated, and more underpressure is generated in each of the combinations of ducts 31, 32; 41, 42.

In case at least one air duct is present, for example in the first combination of ducts 31, 32, air is sucked in the main duct 31, through the air duct, and gets entrained in the flow of the liquid and the condensed steam. In this way, a hot frothed beverage is obtained.

In each combination of ducts 31, 32; 41, 42, a ratio between an obtained flow rate of the liquid and a flow rate of the steam is related to a ratio between a cross-sectional area of the main duct 31, 41 and a cross-sectional area of the associated subsidiary duct 32, 42. For a given flow rate of the steam, the obtained flow rate of the liquid increases when the cross-sectional area of the subsidiary duct 32, 42 is decreased with respect to the cross-sectional area of the main duct 31, 41. Hence, it is a preferred option to have a beverage making unit 1 in which a cross-sectional area of the subsidiary ducts 32, 42 is smaller than a cross-sectional area of the main ducts 31, 41.

Within the scope of the present invention, it is possible that measures are applied for the purpose of locally restricting at least one of the flows of the liquids. For example, a portion of the main duct 31 of the first combination of ducts 31, 32 may be narrowed, or obstacles may be arranged in this duct 31. In this way, a possibility of adapting a flow rate of the liquid is obtained. Within the scope of the present invention, the extent to which the flow of the liquid is locally restricted may be adjustable. As the liquid is heated by the steam, it is advantageous to have a possibility of controlling the flow rate of the liquid, as in this way, a possibility of controlling the resulting temperature of the mixture that is obtained on the basis of the liquid and the steam is created. In general, the resulting temperature of the mixture increases when the restriction to the flow of the liquid increases.

In each combination of ducts 31, 32; 41, 42, in order to have a good pumping action, it is important that the angle θ between the main duct 31, 41 and the subsidiary duct 32, 42 is smaller than 90°. In case the angle θ would be 90°, the flow of steam would practically not lead to a flow of the liquid in the main duct 31, 41, as in that case, the steam would not have a momentum in a direction in which motion of the liquid is allowed, i.e. a direction in which the longitudinal axis of the main duct 31, 41 extends. In case the angle θ would be larger than 90°, the influence of the flow of steam on the liquid in the main duct 31, 41 would only cause the liquid to flow backward, i.e. in a direction toward the reservoir 21, 22. When the liquid is milk, a good performance of the beverage making unit 1 is obtained when the angle θ between the main duct 31, 41 and the subsidiary duct 32, 42 is about 25°.

In the shown example, the duct system 30 of the beverage making unit 1 comprises two combinations of a main duct 31, 41 and a subsidiary duct 32, 42 merging into the main duct 31, 41. However, within the scope of the present invention, the duct system 30 may comprise more than two combinations of ducts 31, 32; 41, 42. Furthermore, in the shown example, the steam generator 16 comprises two steam sockets 17, 18. When the cartridge 10 is received in the beverage maker 15, each of the steam sockets 17, 18 is connected to another of the subsidiary ducts 32, 42 which are part of the duct system 30 of the beverage making unit 1 of the cartridge 10. In this way, it is achieved that both combinations of ducts 31, 32; 41, 42 are directly connected to the steam generator 16, and that the design of the duct system 30 may be relatively simple, given the fact that two steam supplying members are available for connection to the duct system 30, one for each inlet 36, 46 of the subsidiary ducts 32, 42 of the duct system 30.

The beverage maker 15 as diagrammatically shown in FIG. 2 is not only capable of receiving and operating cartridges 10 having a beverage making unit 1 in which at least two combinations of ducts 31, 32; 41, 42 are present, and in which at least two steam inlets 36, 46 are present. It is also possible that the beverage maker 15 is used for the purpose of receiving and operating a cartridge having only one steam inlet. In such a case, only one of the steam sockets 17, 18 of the steam generator 16 of the beverage maker is in communication with the duct system 30 of the beverage making unit of the cartridge, while another of these steam sockets 17, 18 is closed. Hence, the beverage maker 15 is applicable in many different ways, for the purpose of receiving and operating many different cartridges. This is an important advantage with respect to beverage makers in which only one connection to a steam generator 16 is available.

It is not necessary for the disposable cartridge 10 to be provided with reservoirs 21, 22 containing the liquids to be used in the process of preparing the beverage. It is also possible that the beverage maker 15 comprises at least one reservoir, wherein the liquid inlet 35, 45 of a main duct 31, 41 is connectable to the reservoir, and wherein an open communication between the main duct 31, 41 and the reservoir may be established upon receipt of the cartridge 10 in the beverage maker 15. Furthermore, it is possible that at least one external reservoir is used, which may even be a carton containing the liquid, and that a hose for putting the main duct 31, 41 in communication with the liquid in the external reservoir is applied.

In principle, it is possible to apply a cartridge which is intended for more uses than just a single one. Such a cartridge may be of the same design as the shown disposable cartridge 10. In case the cartridge comprises at least one reservoir 21, 22, this reservoir 21, 22 is arranged such as to be refillable, or this reservoir 21, 22 comprises a quantity of liquid which is adapted to being used for a predetermined number of uses, wherein the number is more than one. In case the cartridge does not have a reservoir 21, 22, it is up to the user to decide how many times the cartridge will be used before it is thrown away.

The beverage maker 15 may be arranged such as to supply different quantities of beverage, depending on a choice of the user. For example, the user may choose to have a single quantity of beverage or a double quantity of beverage. In such a case, the reservoirs 21, 22 of the disposable cartridge 10 may comprise double quantities of liquid, so that the disposable cartridge 10 is suitable to be used two times for the purpose of preparing a single quantity of beverage or one time for the purpose of preparing a double quantity of beverage.

With respect to the steam generator 16, it is noted that the beverage maker 15 may comprise a refillable water tank for containing water and a water supplying arrangement for supplying water to the steam generator 16 during operation of the beverage maker 15, in any suitable manner known per se. It is also possible that the steam generator 16 is connected to the water mains. Furthermore, it is noted that in case one or more of the fluids used for the purpose of preparing a beverage by applying the beverage making unit 1 comprises water, the relevant inlet or inlets of the duct system 30 of the beverage making unit 1 may also be connected to the water tank or the water mains.

In the shown example, the steam generator 16 comprises two steam sockets 17, 18, wherein the steam generator 16 is capable of supplying steam at two different positions. When the cartridge 10 is operated for the purpose of making two beverages one after another, it is advantageous for the beverage maker 15 to have controllable closing means, for example a controllable valve, which are adapted to keeping a steam socket 17, 18 closed when this steam socket 17, 18 does not need to supply steam, and to leaving a steam socket 17, 18 open as long as a supply of steam is needed from this steam socket 17, 18. For example, when the cartridge 10 is used in a process of making coffee first and making hot milk only after the coffee has been made, the closing means are controlled such as to first keep a steam socket 17 which is connected to the first combination of ducts 31, 32 of the duct system 30 of the beverage making unit 1 of the cartridge 10 closed, while leaving a steam socket 18 which is connected to the second combination of ducts 41, 42 of the duct system 30 of the beverage making unit 1 of the cartridge 10 open, and to later keep the latter steam socket 18 closed, while leaving the first steam socket 17 open.

In principle, it is also possible that the cartridge 10 is connected to only one steam socket 17, 18 of the steam generator 16, and that the cartridge 10 is equipped with closing means for letting the steam flow to only one of the combinations of ducts 31, 32; 41, 42 at a time. However, this is not a preferred possibility, as the cartridge 10 is disposable, and the closing means are relatively expensive. Moreover, the closing means require space, while it is preferred to have a compact cartridge 10. Furthermore, an advantage of positioning the closing means in the beverage maker 15 is that it is easy to provide electric currency to the closing means, which is necessary for controlling the closing means. In case the closing means would be present in the cartridge 10, it would be necessary to take measures in order to ensure that a proper connection of the closing means to electric wires or the like is established when the cartridge 10 is placed in the beverage maker 15.

The beverage making unit 1 according to the present invention comprises a duct system 30. Within the scope of the present invention, numerous possibilities of the number of ducts of the duct system 30 and the configuration of these ducts exist. The duct system 30 may be designed as the duct system 30 shown in FIGS. 1 and 2, but may also be of a different design. In the following, a number of possible other designs will be explained with reference to FIGS. 3-5. It is noted that all shown duct systems 30 are suitable to be part of a beverage making unit of a cartridge which is adapted to being operated by a beverage maker 15 as shown in FIG. 2. For sake of clarity, directions of flows which are present in the shown duct systems 30 during operation are indicated by means of arrows in the figures.

In FIG. 3, a duct system 30 of a beverage making unit 2 according to a second preferred embodiment of the present invention is shown.

Like the beverage making unit 1 according to the first preferred embodiment of the present invention, the beverage making unit 2 according to the second preferred embodiment of the present invention comprises two combinations of ducts, wherein each combination of ducts serves for preparing a beverage. In fact, each of the combinations of ducts comprises two ejector pumps arranged in series, wherein each pump comprises a main duct and a subsidiary duct merging into the main duct.

A first combination of ducts comprises a main duct 31, a subsidiary duct 32, and an intermediate duct 33. A first ejector pump comprises the subsidiary duct 32 and the intermediate duct 33, wherein the subsidiary duct 32 merges into the intermediate duct 33, and a second ejector pump comprises the main duct 31 and an outlet portion 33b of the intermediate duct 33, wherein the outlet portion 33b of the intermediate duct 33 merges into the main duct 31. In the first ejector pump, an angle $\theta$ between the intermediate duct 33 and the subsidiary duct 32 is smaller than 90°, in an order of about 25°. In the second ejector pump, the same applies to an angle $\theta$ between the main duct 31 and the outlet portion 33b of the intermediate duct 33. A second combination of ducts is designed in the same manner as the first combination of ducts, and comprises a first duct 43, a second duct 42 and a third duct 41, which are configured in the same manner as the ducts 31, 32, 33 of the first combination of ducts.

The beverage making unit 2 according to the second preferred embodiment of the present invention may be used for the purpose of preparing various beverages. In a practical application, in each of the combinations of ducts 31, 32, 33; 41, 42, 43, an inlet portion 33a, 43a of the intermediate duct 33, 43 is used for the purpose of conveying cold water, the subsidiary duct 32, 42 is used for the purpose of conveying steam, and an inlet portion 31a, 41a of the main duct 31, 41 is used for the purpose of conveying a liquid such as milk concentrate or liquid coffee extract. In such a case, during operation, the cold water is pumped by the steam, under the influence of an underpressure which is obtained as a result of a transfer of momentum from the steam to the water, and the cold water is heated by the steam, while the steam condenses in the water. In this way, hot water is obtained, which is conveyed through an outlet portion 33b, 43b of the intermediate duct 33, 43 toward the main duct 31, 41. Under the influence of the hot water which is output by the first ejector pump, the liquid in the main duct 31, 41 is pumped, and is thinned down and heated. This liquid is conveyed toward an outlet 39, 49 of the duct system 30 by an outlet portion 31b, 41b of the main duct 31, 41.

According to a practical possibility of applying the beverage making unit 2 according to the second preferred embodiment of the present invention, fluid that is supplied by the inlet portion 31a of the main duct 31 of the first combination of ducts 31, 32, 33 is milk concentrate, and fluid that is supplied by the inlet portion 41a of the main duct 41 of the second combination of ducts 41, 42, 43 is liquid coffee extract. Preferably, a beverage maker in which a cartridge having the beverage making unit 2 is applied is adapted to operating one of the combinations of ducts 31, 32, 33; 41, 42, 43 or both combinations of ducts 31, 32, 33; 41, 42, 43, simultaneously or one after another, in accordance with input representing the desires of a user of the beverage maker. For example, the cartridge may be used for the purpose of obtaining a mixture of hot coffee and hot milk, hot coffee on hot milk, hot milk on hot coffee, hot milk, and hot coffee.

Many remarks which have been made in respect of the beverage making unit 1 according to the first preferred embodiment of the present invention are also applicable to the beverage making unit 2 according to the second preferred embodiment of the present invention. Among other things, it is also possible to have one or more inlets for letting in air arranged in at least one of the ducts 31, 32, 33; 41, 42, 43 of the duct system 30, so that the beverage that is eventually obtained by applying the beverage making unit 2 according to the second preferred embodiment of the present invention may be frothed. Furthermore, it is also possible for this beverage making unit 2 to comprise more than two combinations of ducts 31, 32, 33; 41, 42, 43.

It is important to note that when a cartridge having the beverage making unit 2 is placed in a beverage maker 15, at least two inlets of the cartridge, which are associated with the subsidiary ducts 32, 42 of the duct system 30 of the beverage making unit 2, are connected to the steam generator 16 of the beverage maker 15, in particular to the steam sockets 17, 18 of the steam generator 16. As a result, the design of the duct system 30 may be relatively simple. The ducts 31, 32, 33; 41, 42, 43 of the duct system 30 may be as short as possible, and have small bends or even no bends at all. Furthermore, the duct system may be designed such as to be more or less symmetrical. All these measures result in a compact cartridge having low flow resistance and small heat losses.

It is noted that a cartridge in which the duct system 30 of the beverage making unit comprises only two ejector pumps arranged in series, wherein each pump comprises a main duct and a subsidiary duct merging into the main duct, and wherein a main duct of one of these ejector pumps functions as a subsidiary duct of another of these ejector pumps, is also within the scope of the present invention. In fact, in such a case, the duct system 30 comprises a combination of ducts which resembles one of the combinations of ducts 31, 32, 33; 41, 42, 43 which are part of the duct system 30 of the beverage making unit 2 according to the second preferred embodiment of the present invention. The fluids which are conveyed by the subsidiary duct 32 and the intermediate duct 33 are both to be regarded as fluids to be applied in a pumping flow of fluid. The fluid which is conveyed by the intermediate duct 33 is applied in a pumping flow of fluid for pumping fluid in the main duct 31, after having been put in motion under the influence of the fluid supplied by the subsidiary duct 32.

In FIG. 4, a duct system 30 of a beverage making unit 3 according to a third preferred embodiment of the present invention is shown.

Like the beverage making units which have been discussed in the foregoing, the beverage making unit 3 according to the third preferred embodiment of the present invention comprises two combinations of ducts, wherein each combination of ducts serves for preparing a beverage, and wherein each combination of ducts comprises a main duct 31, 41 and a subsidiary duct 32, 42. In each combination of ducts 31, 32; 41, 42, the main duct 31, 41 is adapted to supplying a first fluid and to receiving a second fluid, wherein the subsidiary duct 32, 42 is adapted to supplying the second fluid, and is arranged such as to merge into the main duct 31.

It is noted that, although this is not shown in FIG. 4, it is possible to have one or more inlets for letting in air arranged in one of the ducts 31, 32; 41, 42. In such a case, it is possible to supply air for the purpose of forming froth. Furthermore, it is possible for the duct system 30 to comprise more than two combinations of ducts 31, 32; 41, 42. Within the scope of the present invention, other possibilities and alternatives are feasible, among which a number of the possibilities and alternatives mentioned in respect of the beverage making unit 1 according to the first preferred embodiment of the present invention.

In each combination of the ducts 31, 32; 41, 42, the main duct 31, 41 comprises a widened portion 31c, 41c at the positions where the subsidiary duct 32, 42 merges into the main duct 31, 41, which will hereinafter be referred to as chamber 31c, 41c. An end portion 32a, 42a of the subsidiary duct 32, 42, which is connected to the main duct 31, 41, is restricted. Hence, each combination of ducts 31, 32; 41, 42 is adapted to letting a flow of the second fluid that is supplied by the subsidiary duct 32, 42 perform a pumping action of the first fluid that is supplied by the main duct 31, 41, so that it is not necessary to have a separate pump for pumping the first fluid. In particular, each combination of ducts 31, 32; 41, 42 is adapted to letting a flow of the second fluid perform a pumping action of the first fluid on the basis of the venturi principle, according to which a first fluid is sucked in a chamber under the influence of a local underpressure that is obtained by successively conducting a second fluid through a restriction and supplying this second fluid to the chamber.

During operation of the beverage making unit 3 according to the third preferred embodiment of the present invention, in each combination of ducts 31, 32; 41, 42, the second fluid that is supplied by the subsidiary duct 32, 42 is applied for the purpose of pumping the first fluid, wherein a flow of the first fluid is obtained under the influence of the flow of the second fluid. In particular, in the subsidiary duct 32, 42, the second fluid is pressurized by the restricted end portion 32a, 42a before the second fluid enters the chamber 31c, 41c. In the chamber 31c, 41c, an underpressure is created, under the influence of which the first fluid is pumped into the chamber 31c, 41c. Furthermore, in the chamber 31c, 41c, the first fluid and the second fluid are mixed. Also, in case the fluids are initially at different temperatures, a transfer of heat from the fluid at the higher temperature to the fluid at the lower temperature takes place in the chamber 31c, 41c.

For sake of completeness, it is noted that in order to obtain an effective pumping action of the flow of the second fluid on the flow of the first fluid in the main duct 31, 41, the flow of the second fluid is supplied at an angle of 90° with respect to the flow of the first fluid.

Many remarks which have been made in respect of the beverage making unit 1 according to the first preferred embodiment of the present invention are also applicable to the beverage making unit 3 according to the third preferred embodiment of the present invention. Among other things, it is also possible to have one or more inlets for letting in air arranged in at least one of the ducts 31, 32; 41, 42 of the duct system 30, so that the beverage that is eventually obtained by applying the beverage making unit 3 according to the third preferred embodiment of the present invention may be frothed. Furthermore, it is also possible for this beverage making unit 3 to comprise more than two combinations of ducts 31, 32; 41, 42.

A cartridge having the beverage making unit 3 according to the third preferred embodiment of the present invention may be placed in a beverage maker 15 for operating the cartridge. In case the beverage maker 15 comprises a steam generator 16 for supplying steam, and the steam is applied as the second fluid which serves for pumping the first fluid, at least two inlets of the cartridge, which are associated with the subsidiary ducts 32, 42 of the duct system 30 of the beverage making unit 3, are connected to the steam generator 16 of the beverage maker 15, in particular to two steam sockets 17, 18 of the steam generator 16. As a result, the design of the duct system 30 may be relatively simple, for reasons which have already been mentioned in the foregoing.

In FIG. 5, a duct system 30 of a beverage making unit 4 according to a fourth preferred embodiment of the present invention is shown. This duct system 30 comprises a main duct 51, two distribution ducts 52, 53, and two pairs of subsidiary ducts 54a, 54b, 55a, 55b, wherein each pair of subsidiary ducts 54a, 54b, 55a, 55b is formed like two branches of a distribution duct 52, 53, and wherein all subsidiary ducts 54a, 54b, 55a, 55b merge into the main duct 51. In the shown example, the distribution ducts 52, 53 extend at opposite sides of the main duct 51, and the pairs of subsidiary ducts 54a, 54b, 55a, 55b are arranged at opposite sides of the main duct 51 as well. Furthermore, the various subsidiary ducts 54a, 54b, 55a, 55b merge into the main duct 51 at different positions along the longitudinal axis of the main duct 51.

Within the scope of the present invention, the number of subsidiary ducts 54a, 54b, 55a, 55b associated with one distribution duct 52, 53 may be more than two, and the number of distribution ducts 52, 53 having at least two branches (subsidiary ducts 54a, 54b, 55a, 55b) may be more than two as well. It is preferred if subsidiary ducts 54a, 54b, 55a, 55b associated with different distribution ducts 52, 53 merge into the main duct 51 at different sides of the main duct 51, but this is not necessary within the scope of the present invention.

The main duct 51 is adapted to supplying a fluid and to receiving one or more other fluids from the distribution ducts 52, 53, through the subsidiary ducts 54a, 54b, 55a, 55b. Both distribution ducts 52, 53 are adapted to supplying a fluid, wherein the distribution ducts 52, 53 may be applied for the purpose of conveying different fluids, or for the purpose of conveying the same fluid. For example, the main duct 51 is applied for supplying a liquid such as milk, and both distribution ducts 52, 53 are applied for supplying steam. In such a case, during operation of the beverage making unit 4, the steam is supplied to the main duct 51 at four places, through the two pairs of subsidiary ducts 54a, 54b, 55a, 55b. In the process, due to the configuration of the subsidiary ducts 54a, 54b, 55a, 55b, the steam is supplied in portions, at different positions on the main duct 51, and the risk of local boiling of the liquid is reduced, while the mixing process of the liquid and the steam is enhanced.

Besides the shown ducts 51, 52, 53, 54a, 54b, 55a, 55b, the duct system 30 of the beverage making unit 4 may also comprise at least one air duct for letting in air to at least one of these other ducts 51, 52, 53, 54a, 54b, 55a, 55b of the duct system 30, so as to obtain froth.

The beverage making unit 4 is adapted to being applied in a beverage maker 15, and may be part of a disposable cartridge, for example. Preferably, such a cartridge comprises two inlets, wherein each inlet is associated with a distribution duct 52, 53, so that the cartridge may be of a relatively simple design, wherein the various ducts in the cartridge may be relatively short and have little bends. As a result, the flow resistance of the cartridge may be lower, heat losses may be reduced, and a balanced supply of fluid(s) from the distribution ducts 52, 53 to the main duct 51, through the subsidiary ducts 54a, 54b, 55a, 55b, may be realized. In case the distribution ducts 52, 53 are used for the purpose of supplying steam, a cartridge having the beverage making unit 4 may be operated by a beverage maker 15 as shown in FIG. 2, which has two steam sockets 17, 18 which are connectable to the inlets of the cartridge.

It will be clear to a person skilled in the art that the scope of the present invention is not limited to the examples discussed in the foregoing, but that several amendments and modifications thereof are possible without deviating from the scope of the present invention as defined in the attached claims.

The duct system 30 of the beverage making unit 1 according to the first preferred embodiment of the present invention comprises two ejector pumps arranged in parallel, whereas the duct system 30 of the beverage making unit 3 according to the third preferred embodiment of the present invention comprises two venturi pumps arranged in parallel. Within the scope of the present invention, it is also possible that a beverage making unit comprises combinations of ducts forming pumps of different types. For example, a beverage making unit having one ejector pump and one venturi pump, arranged in parallel, is covered by the attached claims. In principle, the number of pumps may be chosen freely, and the same applies to the type of pumps, wherein various types of pumps may be applied in one beverage making unit.

In the duct system 30 of the beverage making unit 1, 2, 3, 4, an inlet may be arranged for letting in a dry substance such as cacao powder to the duct system 30. In such a case, the process of preparing a beverage also involves adding the dry substance.

In the foregoing, a system for preparing a beverage is disclosed, which comprises a beverage maker 15 and a cartridge 10 that is removably arranged in the beverage maker 15. The cartridge 10 comprises a beverage making unit 1, 2, 3, 4 having a duct system 30 for conveying flows of fluid, for example flows of steam and flows of liquid. In a number of preferred embodiments, the duct system 30 comprises two combinations of ducts 31, 32, 33; 41, 42, 43, wherein the arrangement of the ducts 31, 32, 33; 41, 42, 43 of each combination is adapted to enabling at least flow of fluid to perform a pumping action on another flow of fluid. The beverage maker 15 comprises at least two supplying members 17, 18 for supplying fluid to be applied in a pumping flow of fluid, wherein each supplying member 17, 18 is in communication with another combination of ducts 31, 32, 33; 41, 42, 43 of the duct system 30. As each of the combinations of ducts 31, 32, 33; 41, 42, 43 is associated with a different inlet 36, 46, and the inlets 36, 46 may be located at different positions on the cartridge 10, it is achieved that the duct system 30 may be of a relatively simple design, wherein each of the ducts 32, 42 for conveying the fluid to be applied in a pumping flow of fluid may be directly connected to another of these inlets 36, 46. Furthermore, as the beverage maker 15 comprises at least two supplying members 17, 18 for supplying fluid to be applied in a pumping flow of fluid, the beverage maker 15 is suitable to be used for the purpose of receiving and operation various types of cartridges, including cartridges 10 having at least two inlets 36, 46 for letting in fluid to be applied in a pumping flow of fluid.

The invention claimed is:

1. A cartridge for a beverage making unit, the cartridge comprising:
   at least two inlets;
   an outlet; and
   a duct system for conveying fluids between the inlet and the outlet;
   wherein the duct system is adapted to enabling at least one flow of fluid to perform a pumping action on another flow of fluid; and
   wherein the at least two inlets are configured to let in fluid to be applied in a pumping flow of fluid.

2. Cartridge according to claim 1, wherein the duct system comprises at least one main duct and at least two subsidiary ducts merging into such a main duct, wherein the subsidiary ducts are adapted to conveying a pumping flow of fluid, and wherein the main duct is adapted to conveying a pumped flow of fluid.

3. Cartridge according to claim 2, wherein each subsidiary duct is associated with another inlet of the at least two inlets for letting in fluid to be applied in a pumping flow of fluid.

4. Cartridge according to claim 2, wherein the duct system comprises more than two subsidiary ducts and at least one distribution duct associated with an inlet of the at least two inlets for letting in fluid to be applied in a pumping flow of fluid, wherein the distribution duct is connected to at least two subsidiary ducts.

5. Cartridge according to claim 2, wherein the duct system comprises at least two combinations of a main duct and at least one subsidiary ducts, wherein each combination is associated with another inlet of the at least two inlets for letting in fluid to be applied in a pumping flow of fluid.

6. Cartridge according to claim 1, wherein the arrangement of ducts of the duct system is adapted to enabling at least one flow of fluid to perform a pumping action on another flow of fluid under the influence of a local underpressure which is obtained on the basis of a transfer of momentum from the pumping flow of fluid to the pumped flow of fluid.

7. Cartridge according to claim 6, wherein a longitudinal axis of a duct for conveying the pumping flow of fluid extends at an angle ($\theta$) smaller than 90° with respect to a longitudinal axis of a duct for conveying the pumped flow of fluid at the position where the first duct merges into the latter duct.

8. Cartridge according to claim 1, wherein the arrangement of ducts of the duct system is adapted to enabling at least one flow of fluid to perform a pumping action on another flow of fluid under the influence of a local underpressure which is obtained by having a restriction in a duct for conveying the pumping flow of fluid in the vicinity of a position where this duct merges into a duct for conveying the pumped flow of fluid.

9. Cartridge according to claim 8, wherein an end portion of the duct for conveying the pumping flow of fluid, through which this duct is connected to the duct for conveying the pumped flow of fluid, is restricted, and wherein a portion of the duct for conveying the pumped flow of fluid, into which the duct for conveying the pumping flow of fluid merges, is widened.

10. Cartridge according to claim 1, comprising at least one reservoir containing a beverage ingredient.

11. Cartridge according to claim 1, wherein the duct system comprises at least one air inlet for letting in air to the duct systems.

* * * * *